US012132251B2

(12) United States Patent
Fu et al.

(10) Patent No.: US 12,132,251 B2
(45) Date of Patent: Oct. 29, 2024

(54) ELECTRONIC DEVICE

(71) Applicant: VIVO MOBILE COMMUNICATION CO., LTD., Dongguan (CN)

(72) Inventors: Xing Fu, Dongguan (CN); Rui Jiang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 181 days.

(21) Appl. No.: 17/990,324

(22) Filed: Nov. 18, 2022

(65) Prior Publication Data

US 2023/0085202 A1 Mar. 16, 2023

Related U.S. Application Data

(63) Continuation of application No. PCT/CN2021/094125, filed on May 17, 2021.

(30) Foreign Application Priority Data

May 20, 2020 (CN) ......................... 202010429810.4

(51) Int. Cl.
*H01Q 1/24* (2006.01)
*H01Q 1/50* (2006.01)

(52) U.S. Cl.
CPC ............... *H01Q 1/243* (2013.01); *H01Q 1/50* (2013.01)

(58) Field of Classification Search
CPC .... H01Q 1/22; H01Q 1/242–243; H01Q 5/22; H01Q 5/28; H01Q 5/30; H01Q 5/335; H01Q 5/50; H01Q 9/30; H01Q 9/40
See application file for complete search history.

(56) References Cited

U.S. PATENT DOCUMENTS 6,734,825 B1 * 5/2004 Guo ....................... H01Q 1/243 343/893
7,633,448 B2 * 12/2009 Su ............................ H01Q 9/42 343/702
8,179,322 B2 5/2012 Nissinen
(Continued)

FOREIGN PATENT DOCUMENTS

CN 1729593 A 2/2006
CN 101237079 A 8/2008
(Continued)

*Primary Examiner* — Jason M Crawford
(74) *Attorney, Agent, or Firm* — The Webb Law Firm

(57) ABSTRACT

An antenna module of the electronic device includes a first radiator and a second radiator. The first radiator and the second radiator respectively correspond to different communication frequency bands, and the first radiator includes: a first sub-radiator, a second sub-radiator, a first connection portion, and a second connection portion. A common feeding structure is disposed between the first sub-radiator and the second radiator, and the first sub-radiator is connected to the second sub-radiator through the first connection portion and the second connection portion. The common feeding structure and the first sub-radiator are disposed on a non-metallic area of an inner side surface of a housing of the electronic device, the second sub-radiator is disposed on a non-metallic area of an outer surface of the housing, and the second radiator is disposed on a non-metallic area of the inner side surface or a non-metallic area of the outer surface.

10 Claims, 4 Drawing Sheets

(56) References Cited

U.S. PATENT DOCUMENTS 8,957,827 B1* 2/2015 Lee ........................ H01Q 5/378
343/702
9,124,003 B2 9/2015 Jenwatanavet
9,711,858 B1* 7/2017 Lee .......................... H01Q 9/06
2004/0080457 A1* 4/2004 Guo ..................... H01Q 9/0421
343/702
2008/0129644 A1 6/2008 Seo et al.
2008/0191954 A1* 8/2008 Tsujimura ................ H01Q 9/40
343/787
2011/0043408 A1* 2/2011 Shi ........................... H01Q 1/48
343/700 MS
2013/0135168 A1 5/2013 Kim et al.
2013/0249744 A1* 9/2013 Jang ......................... H01Q 9/42
343/702
2014/0078017 A1* 3/2014 Vanjani .................. H01Q 5/371
343/878
2015/0349407 A1* 12/2015 Nishizaka .............. H01Q 1/243
343/702
2018/0183139 A1* 6/2018 Liu ........................ H01Q 1/243
2019/0260127 A1* 8/2019 Shi ........................... H01Q 9/42
2021/0175631 A1* 6/2021 Wu ........................ H01Q 13/16
2021/0296766 A1* 9/2021 Li ......................... H04M 1/026
2021/0359392 A1* 11/2021 Won ....................... H01Q 5/307
2022/0328961 A1* 10/2022 Wu ........................ H01Q 1/243
2022/0344814 A1* 10/2022 Tan ........................ H01Q 5/371
2023/0042814 A1* 2/2023 Lee ........................ H01Q 5/371
2023/0082661 A1* 3/2023 Fu ............................ H01Q 9/42
343/700 R
2023/0085202 A1* 3/2023 Fu ............................ H01Q 1/50
343/700 R

FOREIGN PATENT DOCUMENTS

CN 102934283 A 2/2013
CN 105009363 A 10/2015
CN 108258382 A 7/2018
CN 108736148 A 11/2018
CN 108808228 A 11/2018
CN 111555019 A 8/2020

* cited by examiner

ELECTRONIC DEVICE

CROSS-REFERENCE TO RELATED APPLICATIONS

This application is a Bypass Continuation Application of PCT/CN2021/094125 filed May 17, 2021, which claims priority to Chinese Patent Application No. 202010429810.4 filed May 20, 2020, the disclosures of which are hereby incorporated by reference in their entirety.

BACKGROUND OF THE INVENTION

Field of the Invention

Embodiments of this application relate to the field of communications technologies, and in particular, to an electronic device.

Description of Related Art

In 4G and 5G communications technologies, multiple-in multiple-out (MIMO) is used to increase a rate, so that it is required that an electronic device have multiple antennas. On the basis of traditional 4G frequency bands, sub-6G frequency bands, that is, 5G communications frequency bands, are increased, such as N77, N78, N79, N1, N41 and the like. In addition, to achieve a high screen-to-body ratio and thinning of the electronic device, it is required that design space for an antenna be reduced increasingly, which poses greater challenges to antenna layout and antenna solution design.

SUMMARY OF THE INVENTION

An embodiment of this application provides an electronic device, including an antenna module, where the antenna module includes a first radiator and a second radiator, where the first radiator and the second radiator respectively correspond to different communication frequency bands;

the first radiator includes: a first sub-radiator, a second sub-radiator, a first connection portion, and a second connection portion, where a common feeding structure is disposed between the first sub-radiator and the second radiator, and the first sub-radiator is connected to the second sub-radiator through the first connection portion and the second connection portion;

the common feeding structure and the first sub-radiator are disposed on an inner side surface of a housing of the electronic device, the second sub-radiator is disposed on a non-metallic area of an outer surface of the housing of the electronic device, and the second radiator is disposed on a non-metallic area of the inner side surface of the housing of the electronic device or a non-metallic area of the outer surface of the housing of the electronic device.

DESCRIPTION OF THE INVENTION

The following clearly describes the technical solutions in the embodiments of this application with reference to the accompanying drawings in the embodiments of this application. Apparently, the described embodiments are some but not all of the embodiments of the present invention. Based on the embodiments of the present invention, all other embodiments obtained by a person of ordinary skill in the art fall within the protection scope of the present invention.

The terms "first", "second", and the like in this specification and claims of this application are used to distinguish between similar objects instead of describing an order or sequence. It should be understood that the data used in this way is interchangeable in appropriate circumstances so that the embodiments of this application described can be implemented in other orders than the order illustrated or described herein. In addition, "and/or" in the specification and claims represents at least one of connected objects. Symbol "/" in the specification generally represents an "or" relationship between associated objects.

An antenna module provided in an embodiment of this application will be described in detail below through embodiments and application scenarios with reference to the accompanying drawings.

In a traditional antenna design solution, on the premise that an existing size and ultimate appearance remain unchanged, a multi-frequency sub-6G antenna is designed. Due to limited space for the antenna, a height from an antenna radiator to a circuit board of the electronic device is very small, an area where the antenna radiator can be wired is very limited, and many electronic components integrated in a terminal need to be avoided, so that a clearance area required for antenna radiation is extremely small, resulting in a very narrow bandwidth and reducing antenna performance.

Figure 1:
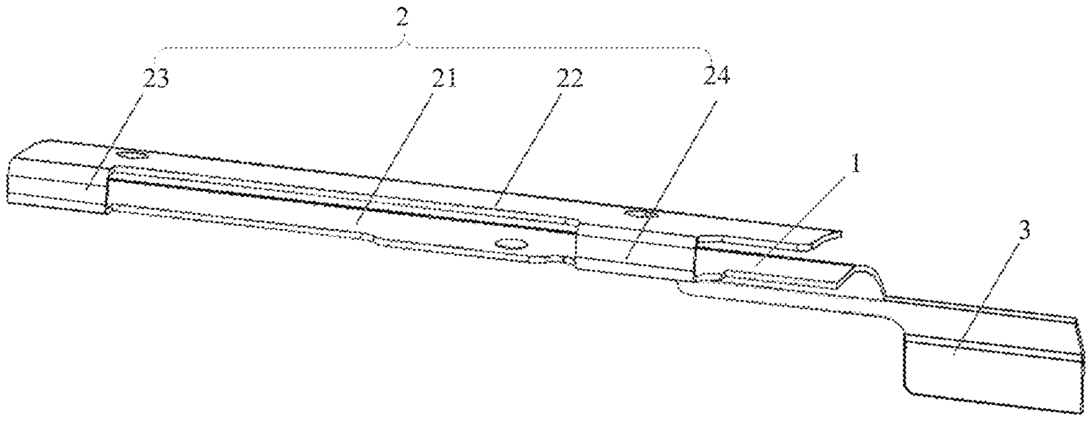
FIG. 1 is a first schematic structural diagram of an antenna module of an electronic device according to an embodiment of this application.

An embodiment of the present invention provides an electronic device. Referring to FIG. 1, an antenna module of the electronic device includes: a first radiator 2 and a second radiator 3;

the first radiator 2 and the second radiator 3 correspond to different communication frequency bands respectively;

the first radiator 2 includes: a first sub-radiator 21, a second sub-radiator 22, a first connection portion 23, and a second connection portion 24, a common feeding structure 1 is disposed between the first sub-radiator 21 and the second radiator 3, and the first sub-radiator 21 is connected to the second sub-radiator 22 through the first connection portion 23 and the second connection portion 24; and the common feeding structure 1 and the first sub-radiator 21 are disposed in a non-metallic area of an inner side surface of a housing of the electronic device, and the second sub-radiator 22 is disposed in a non-metallic area of an outer surface of the housing of the electronic device, and the second radiator 3 is disposed on the non-metallic area of the inner side surface of the housing of the electronic device or the non-metallic area of the outer surface of the housing of the electronic device. It should be noted that one portion of the housing of the electronic device is made of a non-metallic material, which is used for antenna wiring, and the use of the non-metallic material can prevent affecting radiation performance of an antenna branch. The other portion of the housing of the electronic device can be made of metal, to improve structural strength and hand feeling of the electronic device.

In this embodiment of this application, the first radiator 2 and the second radiator 3 extend outward from the common feeding structure 1, and the two radiators correspond to different communication frequency bands respectively. For example, the first radiator 2 corresponds to any frequency band in an N1 (2,110 MHz-2,170 MHz) frequency band, an N3 (1,805 MHz-1,880 MHz) frequency band, or an N41 (2,515 MHz-2,675 MHz) frequency band, and the second radiator 3 corresponds to any frequency band in an N78 (3,400 MHz-3,600 MHz) frequency band and an N79 (4,800 MHz-5,000 MHz) frequency band, so that the antenna module can cover multiple 5G frequency bands.

For example, the first radiator 2 includes the first sub-radiator 21 and the second sub-radiator 22 that are not coplanar. The first sub-radiator 21 is connected to the second sub-radiator 22 through the first connection portion 23 and the second connection portion 24, so that a three-dimensional radiator structure with the greatest volume can be formed.

In an actual application scenario, the antenna module is applied to the electronic device, for example, a mobile phone, a tablet computer, a smart wearable device, and the like. To achieve that the first sub-radiator 21 and the second sub-radiator 22 are not coplanar, when the second radiator 3 and the first sub-radiator 21 or the second sub-radiator 22 are coplanar, the first sub-radiator 21 can be disposed on the inner side surface of the housing of the electronic device, such as an inner side surface of a bracket of an electronic device with a plastic housing, and the second sub-radiator 22 can be disposed on the outer surface of the housing of the electronic device, such as an outer surface of the electronic device with a plastic housing, that is, a portion of the radiator is wired on the inner side surface of the bracket, and the other portion is wired on the outer surface of the bracket by folding or punching, so as to implement spatial multiplexing of the radiator. Correspondingly, the second radiator 3 can be disposed on the inner side surface or the outer surface of the housing of the electronic device. For example, FIG. 1 shows a scenario in which the second radiator 3 and the first sub-radiator 21 are coplanar, that is, the second radiator 3 is disposed on the inner side surface of the housing of the electronic device.

It can be understood that the first sub-radiator 21 and the second sub-radiator 22 are respectively disposed on the inner side surface and the outer surface of the housing of the electronic device. Therefore, the first sub-radiator 21 is located on a first plane or cambered surface (depending on a shape of the inner side surface of the housing of the electronic device), and the second sub-radiator 22 is located on a second plane or cambered surface (depending on the outer surface of the housing of the electronic device).

It should be noted that, the foregoing antenna module can be implemented by different processes. For example, a flexible printed circuit (FPC) process is used, that is, the common feeding structure 1, the first radiator 2, and the second radiator 3 are FPCs. For another example, a laser direct forming (LDS) process is used, that is, the common feeding structure 1, the first radiator 2, and the second radiator 3 are LDS antennas.

In this embodiment of this application, since the first sub-radiator 21 and the second sub-radiator 22 are not coplanar, a distance exists between the first sub-radiator 21 and the second sub-radiator 22 accordingly, and this distance can be used as a clearance height of the first radiator 2. This way, on the one hand, spatial multiplexing is implemented through the first radiator 2 of a three-dimensional structure, preventing occupying too much antenna space, on the other hand, the distance between the first sub-radiator 21 and the second sub-radiator 22 increases the clearance height of an antenna radiator, achieving a maximum wiring area. Therefore, in existing compact structure space, relatively good antenna performance can be achieved, and requirements for antenna performance indicators can be better satisfied.

It should be noted that a distance must exist between the first connection portion 23 and the second connection portion 24, that is, the first sub-radiator 21 and the second sub-radiator 22 must be connected by two connection portions. This is because the first sub-radiator 21, the second sub-radiator 22, the first connection portion 23, and the second connection portion 24 can form a complete loop through the first connection portion 23 and the second connection portion 24, to achieve a radio frequency function of the antenna, and the distance between the first connection portion 23 and the second connection portion 24 can ensure that a current can flow through the first sub-radiator 21 and the second sub-radiator 22, so that it can be prevented that most of the current is concentrated on the first sub-radiator 21, causing the second sub-radiator 22 to lose its function, to be unable to achieve spatial multiplexing and unable to achieve an effect of increasing the clearance height.

Optionally, the first connection portion 23 and the second connection portion 24 respectively connect two ends of the first sub-radiator 21 and the second sub-radiator 22, and the two connection portions are disposed at both ends of the radiators, so that a volume of the formed first radiator 2 can be maximized.

Optionally, widths of the first connection portion and the second connection portion are 1 mm to 5 mm.

In this embodiment of this application, the first radiator is formed by two sub-radiators that are not coplanar, and a radiator with a maximum volume is achieved by spatial multiplexing, so that a clearance height of the first radiator can be increased effectively, and antenna performance can be improved. In addition, the second radiator with a communication frequency band different from that of the first radiator is disposed, so that coverage by multiple communication frequency bands can be achieved in limited space, and a communication effect of the electronic device can be improved.

Optionally, in some implementation manners, a distance between the first sub-radiator 21 and the second sub-radiator 22 in a first direction is greater than or equal to 0.5 mm, and the first direction is an orthographic projection direction of the second sub-radiator 22 to the first sub-radiator 21.

In this embodiment of this application, to prevent interference between non-coplanar sub-radiators while spatial multiplexing is implemented, a distance between non-coplanar sub-radiators needs to be limited.

For example, it is necessary to ensure that the distance between the second sub-radiator 22 and the first sub-radiator 21 in the orthographic projection direction is greater than or equal to 0.5 mm. As the distance is farther, frequency band performance achieved in a folding area (that is, the second sub-radiator 22) is greater. Optionally, in consideration of extreme appearance requirements for some electronic devices, optionally, a distance D in the first direction satisfies: 0.5 mm≤D≤1 mm.

It should be noted that, according to a shape of the housing of the electronic device, a plane where the sub-radiators are located may be inclined. Based on this, if the two sub-radiators located inside and outside the housing are parallel to each other and face each other, the distance between the two sub-radiators in the orthographic direction is a distance between the two sub-radiators, and the distance between the two sub-radiators can be directly limited to be greater than or equal to 0.5 mm; and if the two sub-radiators located inside and outside the housing are not parallel to each other and face each other, and the distance between the two sub-radiators is not equal to the distance between the two sub-radiators in the orthographic direction, the distance between the two sub-radiators in the orthographic direction needs to be limited to be greater than or equal to 0.5 mm.

Figure 2A:
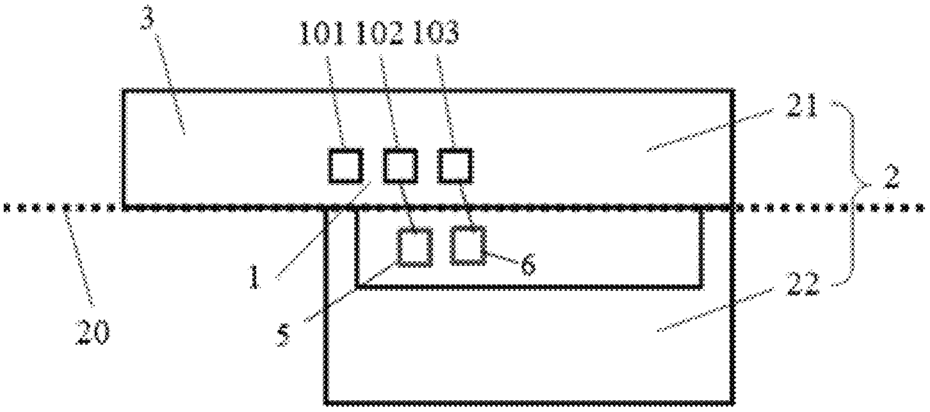
FIG. 2A is a second schematic structural diagram of the antenna module of the electronic device according to an embodiment of this application.
Figure 2B:
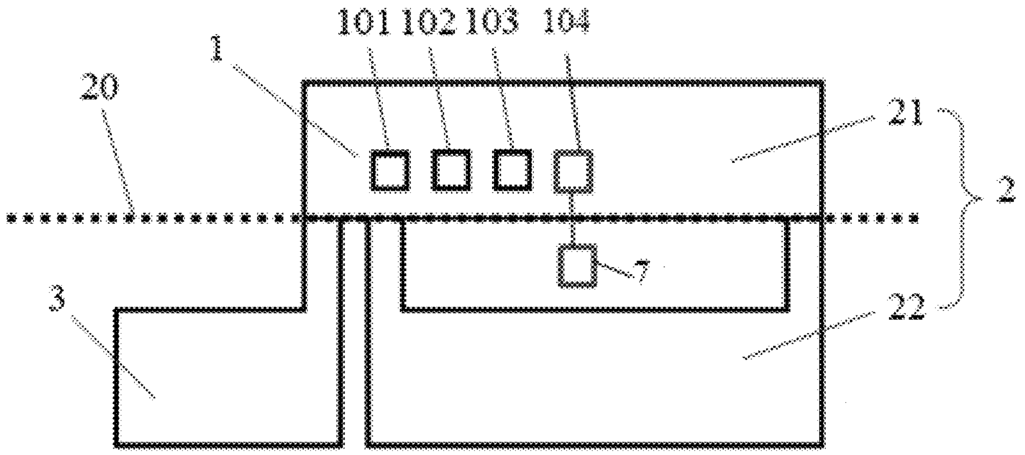
FIG. 2B is a third schematic structural diagram of the antenna module of the electronic device according to an embodiment of this application.

Referring to FIG. 2A and FIG. 2B, FIG. 2A shows a structure after the three-dimensional antenna module shown in FIG. 1 is unfolded into a planar antenna pattern, and FIG. 2B shows a structure after the three-dimensional antenna module is unfolded into a planar antenna pattern on the basis of FIG. 1 when a second radiator 3 is disposed in a position coplanar with a second sub-radiator 22. A dashed line 20 is used to demarcate positions where the radiators are disposed. For example, in FIG. 2A, a part on the dashed line is a first sub-radiator 21, the second radiator 3, and a common feeding structure 1 wired on an inner side surface of a housing of the electronic device, and a part under the dashed line is the second sub-radiator 22 wired on an outer surface of the housing of the electronic device; and In FIG. 2B, a part on the dashed line is the first sub-radiator 21 and the common feeding structure 1 wired on the inner side surface of the housing of the electronic device, and a part under the dashed line is the second sub-radiator 22 and the second radiator 3 wired on the outer surface of the housing of the electronic device. According to different types of radiators, different connection terminals are required be disposed on the common feeding structure 1.

For example, referring to FIG. 2A, in a case that the first radiator 2 and the second radiator 3 are inverted F antennas (IFA), a ground terminal 101 and a switch terminal 102 are disposed on the common feeding structure 1, and the switch terminal 102 is configured to connect to a switch circuit 5, and the switch circuit 5 is configured to switch communication frequency bands corresponding to the first radiator 2 and the second radiator 3.

In this embodiment of this application, to make each radiator an IFA type, the ground terminal 101 and the switch terminal 102 are required be disposed on the common feeding structure 1. The switch terminal 102 is externally connected to a switch circuit 5, and the switch circuit 5 is configured to switch a communication frequency band in use. This way, when different communication frequency bands need to be used, communication frequency bands corresponding to the first radiator 2 and the second radiator 3 can be switched through the switch circuit 5, to implement multi-frequency coverage by a sub-6G antenna. The switch circuit 5 may be an existing switch circuit 5 for frequency band switching, and a structure of the switch circuit 5 is not limited in this embodiment of this application.

Optionally, in some implementation manners, a communication frequency band that the first radiator 2 can correspond to can be determined by setting a length of the first radiator 2 (taking FIG. 2A as an example, that is, a length of the second sub-radiator 22 is the length of the first radiator 2), and a communication frequency band that the second radiator 3 can correspond to can be determined by setting the length of the second radiator 3. For example, the length of the second sub-radiator 22 is set to 20.5 mm, the length of the second radiator 3 is set to 8 mm, and switch is performed through the switch circuit 5 connected to the switch terminal 102 to make the first radiator 2 form a ¼ module, so that requirements for frequency bands N1/N3/N41 of sub-6G can be achieved, and the second radiator 3 can form another ¼ module, to meet requirements for frequency bands N78/N79 of sub-6G.

Optionally, still referring to FIG. 2A, in some embodiments, a first feeding terminal 103 is further disposed on the common feeding structure 1, and the first feeding terminal 103 is configured to connect to a first matching circuit 6, and the first matching circuit 6 is configured to tune the first radiator 2 and the second radiator 3.

In this embodiment of this application, the first feeding terminal 103 is externally connected to the first matching circuit 6 of the switch circuit 5, and the first radiator 2 and the second radiator 3 are tuned through the first matching circuit 6, to improve communication performance of the first radiator 2 and the second radiator 3. The first matching circuit 6 may be an existing circuit including capacitance and/or inductance, and a structure of the first matching circuit 6 is not limited in this embodiment of this application.

Referring to FIG. 2B, a difference between a structure of the antenna module in FIG. 2B and that shown in FIG. 2A is that the second radiator 3 and the second sub-radiator 22 are coplanar, that is, the second radiator 3 is wired on the outer surface of the housing of the electronic device. It should be noted that since the second radiator 3 and the common feeding structure 1 are not coplanar, the second radiator also needs to be connected to the common feeding structure 1 through a connection portion. A distance between a connection portion between the second radiator 3 and the common feeding structure 1 and a connection portion between the first sub-radiator 21 and the second sub-radiator 22 is not required to be limited, and the two connection portions can completely overlap each other or may be spaced apart. Optionally, the distance between the two connection portions is less than or equal to 1 mm, so that two branches can be independently adjusted.

In some implementation manners, based on FIG. 2A and FIG. 2B, in a case that the first radiator 2 and the second radiator 3 are of a monopole type, only a second feeding terminal 104 is required to be disposed on the common feeding structure 1, and the second feeding terminal 104 is configured to connect a second matching circuit 7, and the second matching circuit 7 is configured to switch communication frequency bands corresponding to the first radiator 2 and the second radiator 3.

In this embodiment of this application, to make each radiator a monopole type, only the second feeding terminal 104 is required to be disposed on the common feeding structure 1. The second feeding terminal 104 is externally connected to the second matching circuit 7, and the second matching circuit 7 is configured to switch the communication frequency bands corresponding to the first radiator and the second radiator. This way, when different communication frequency bands need to be used, the communication frequency bands corresponding to the first radiator 2 and the second radiator 3 can be switched through the second matching circuit 7, to implement multi-frequency coverage of a sub-6G antenna. The second matching circuit 7 may be an existing circuit including capacitance and/or inductance, and a structure of the second matching circuit 7 is not limited in this embodiment of this application.

Figure 2C:
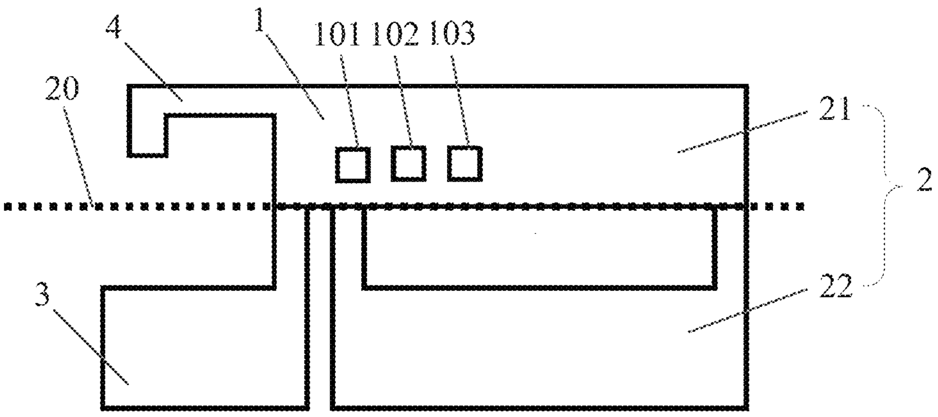
FIG. 2C is a fourth schematic structural diagram of the antenna module of the electronic device according to an embodiment of this application.

Referring to FIG. 2C, another planar structure of the antenna module is shown. A difference between the antenna module and the antenna module shown in FIG. 1 to FIG. 2B is that the antenna module further includes a third radiator 4, and a first radiator 2, a second radiator 3, and the third radiator 4 respectively correspond to different communication frequency bands. The third radiator 4 is connected to a common feeding structure 1, and the second radiator 3 and the third radiator 4 are respectively disposed on an inner side surface and an outer surface of a housing of an electronic device. FIG. 2C shows that the second radiator 3 and a second sub-radiator 22 are coplanar, that is, the second radiator 3 is wired on the outer surface of the housing of the electronic device, and the third radiator 4 and a first sub-radiator 21 are coplanar, that is, the third radiator 4 is wired on the inner side surface of the housing of the electronic device. It can be understood that the second radiator 3 may also be wired on the inner side surface of the housing of the electronic device, and the third radiator 4 may be wired on the outer surface of the housing of the electronic device. This way, three communication frequency bands can be covered simultaneously, for example: coverage of N41/N78/N79, three sub-6G frequency bands, can be achieved, that is, a communication frequency band corresponding to the second radiator 3 is an N78 frequency band, and a communication frequency band corresponding to the third radiator 4 is an N79 frequency band; or a communication frequency band corresponding to the second radiator 3 is an N79 frequency band, and a communication frequency band corresponding to the third radiator 4 is an N78 frequency band.

Each radiator in FIG. 2C is of an IFA type, and therefore a ground terminal 101, a switch terminal 102, and a first feeding terminal 103 can be disposed on the common feeding structure 1. For other structural features, please refer to corresponding description in the antenna module shown in FIG. 1 to FIG. 2B, which will not be repeated herein again.

It can be understood that each radiator in FIG. 2C can also be of a monopole type. In this case, only the feeding terminal is required to be disposed on the common feeding structure 1, a matching circuit is externally connected through the feeding terminal, and the matching circuit is configured to switch communication frequency bands corresponding to the first radiator 2, the second radiator 3, and the third radiator 4.

Figure 3:
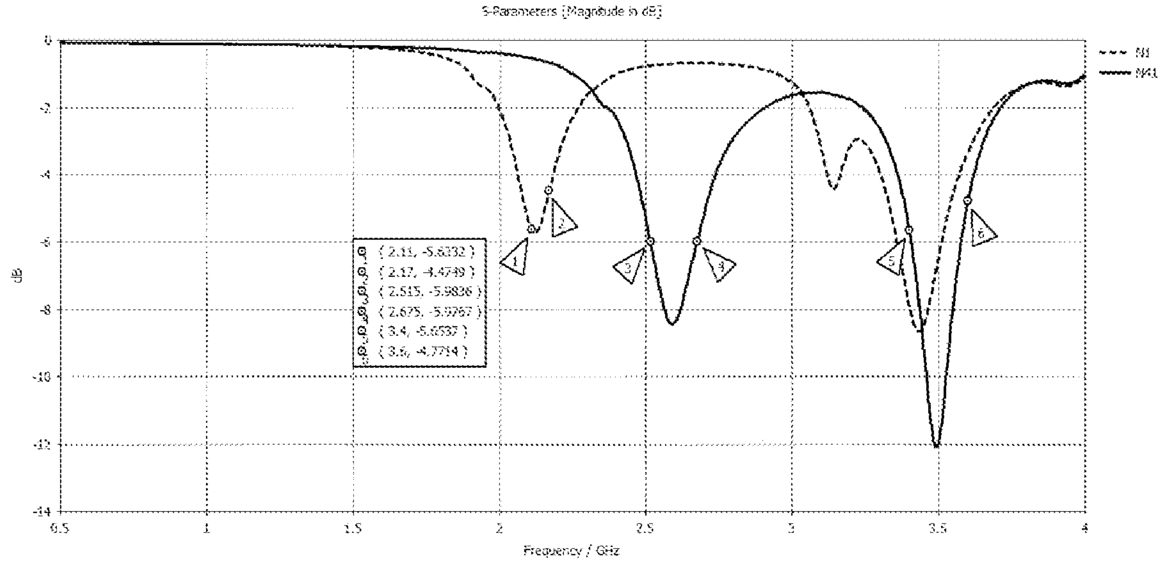
FIG. 3 is a schematic diagram of an antenna return loss according to an embodiment of this application.

Referring to FIG. 3, an antenna return loss by using the antenna module in FIG. 1 is shown, where a dashed line is a return loss when switch to an N1 frequency band is performed through a switch circuit 5, and a solid line is a return loss when switch to an N41 frequency band is performed through the switch circuit 5.

Figure 4:
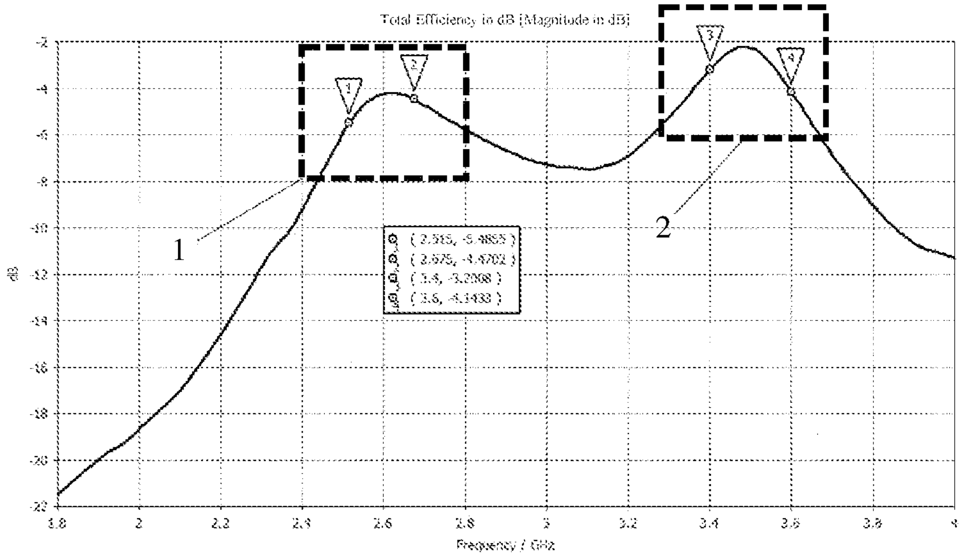
FIG. 4 is a schematic diagram of total efficiency according to an embodiment of this application.

Referring to FIG. 4, total efficiency by using the antenna module in FIG. 1 is shown, where a dashed box 1 represents total efficiency in an N41 frequency band, and a dashed box 2 represents total efficiency in an N78 frequency band.

With reference to FIG. 3 and FIG. 4, it can be found that the antenna module in the embodiments of this application can effectively reduce the antenna return loss and improve the total efficiency.

Figure 5:
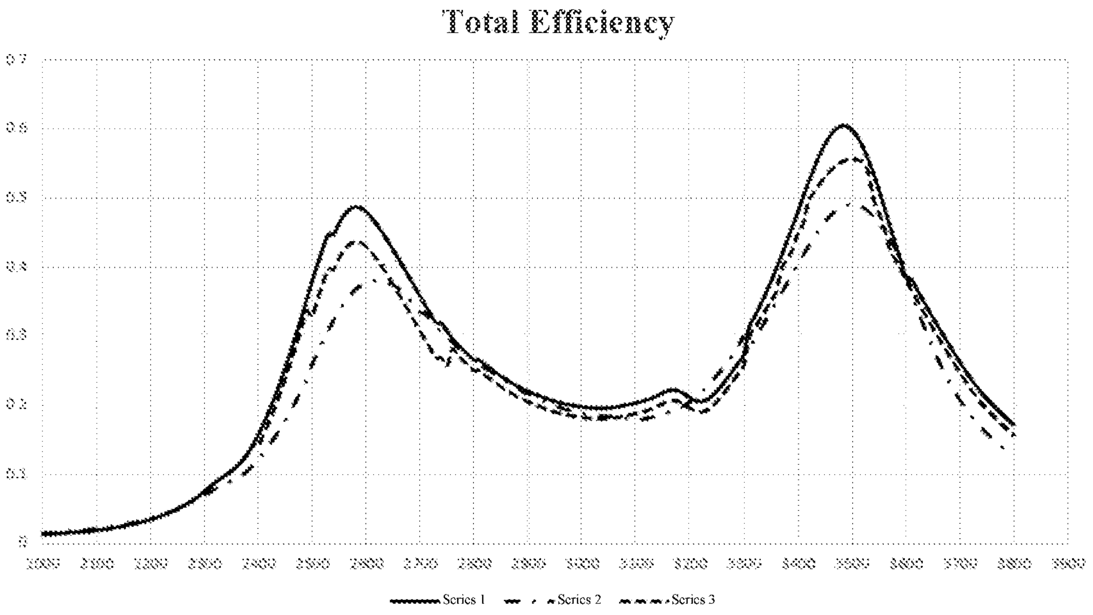
FIG. 5 is a schematic diagram of comparison of total efficiency according to an embodiment of this application.

Referring to FIG. 5, comparison of total efficiency by using the antenna module in FIG. 1 is shown. A solid line represents total efficiency by using the antenna module in FIG. 1, a dashed line represents total efficiency with only wiring design on an outer surface of a housing of an electronic device, and a dash dot line represents total efficiency with only wiring design on an inner side surface of the housing of the electronic device. It can be seen through comparison of total efficiency, for total efficiency in an N41 frequency band by using the antenna module in FIG. 1, a bandwidth is wider than a bandwidth in the other two antenna design solutions, and antenna performance is at least 1 dB greater than that in the other two antenna design solutions. Accordingly, it can be seen that a radiator with the maximum volume achieved by spatial multiplexing can effectively improve the total efficiency.

An embodiment of this application further provides an electronic device, including an antenna module shown in any one of FIG. 1 to FIG. 2B.

For example, a common feeding structure of the antenna module and a first sub-radiator in a first radiator are disposed on an inner side surface of a housing of the electronic device, a second sub-radiator in the first radiator of the antenna module is disposed on an outer surface of the housing of the electronic device, and a second radiator of the antenna module is disposed on the inner side surface or outer surface of the housing of the electronic device.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of the present application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

The embodiments of this application are described above with reference to the accompanying drawings, but this application is not limited to the foregoing implementation manners. The foregoing implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. An electronic device, comprising an antenna module, wherein the antenna module comprises a first radiator and a second radiator; wherein the first radiator and the second radiator respectively correspond to different communication frequency bands;

the first radiator comprises: a first sub-radiator, a second sub-radiator, a first connection portion, and a second connection portion, wherein a common feeding structure is disposed between the first sub-radiator and the second radiator, and the first sub-radiator is connected to the second sub-radiator through the first connection portion and the second connection portion;

the common feeding structure and the first sub-radiator are disposed on a non-metallic area of an inner side surface of a housing of the electronic device, the second sub-radiator is disposed on a non-metallic area of an outer surface of the housing of the electronic device, and the second radiator is disposed on a non-metallic area of the inner side surface of the housing of the electronic device or a non-metallic area of the outer surface of the housing of the electronic device.

2. The electronic device according to claim 1, wherein widths of the first connection portion and the second connection portion are 1 mm to 5 mm.

3. The electronic device according to claim 1, wherein a distance between the first sub-radiator and the second sub-radiator in a first direction is greater than or equal to 0.5 mm, and the first direction is an orthographic projection direction of the second sub-radiator to the first sub-radiator.

4. The electronic device according to claim 1, wherein in a case that the first radiator and the second radiator are inverted F antennas, a ground terminal and a switch terminal are disposed on the common feeding structure, wherein the switch terminal is configured to connect to a switch circuit, and the switch circuit is configured to switch communication frequency bands corresponding to the first radiator and the second radiator.

5. The electronic device according to claim 4, wherein a first feeding terminal is further disposed on the common feeding structure, wherein the first feeding terminal is configured to connect to a first matching circuit, and the first matching circuit is configured to tune the first radiator and the second radiator.

6. The electronic device according to claim 1, wherein in a case that the first radiator and the second radiator are of a monopole antenna type, a second feeding terminal is disposed on the common feeding structure, wherein the second feeding terminal is configured to connect a second matching circuit, and the second matching circuit is configured to switch communication frequency bands corresponding to the first radiator and the second radiator.

7. The electronic device according to claim 1, wherein a communication frequency band corresponding to the first radiator comprises at least one of:

an N1 frequency band;
an N3 frequency band; or
an N41 frequency band.

8. The electronic device according to claim 7, wherein the antenna module further comprises a third radiator; and the first radiator, the second radiator, and the third radiator respectively correspond to different communication frequency bands;

the third radiator is connected to the common feeding structure; and the second radiator and the third radiator are respectively disposed on the inner side surface and the outer surface of the housing of the electronic device.

9. The electronic device according to claim 8, wherein a communication frequency band corresponding to the second radiator is an N78 frequency band, and a communication frequency band corresponding to the third radiator is an N79 frequency band; or a communication frequency band corresponding to the second radiator is an N79 frequency band, and a communication frequency band corresponding to the third radiator is an N78 frequency band.

10. The electronic device according to claim 1, wherein a communication frequency band corresponding to the second radiator comprises at least one of:

an N78 frequency band; or
an N79 frequency band.

* * * * *